Dec. 27, 1960  D. M. PHILLIPS  2,966,372
DRIVE FITTINGS FOR PIPE OR CONDUIT
Filed May 18, 1956

INVENTOR.
DAVIS M. PHILLIPS
BY
*Gundel J. Lucien*
ATTORNEY

United States Patent Office 2,966,372
Patented Dec. 27, 1960

2,966,372

DRIVE FITTINGS FOR PIPE OR CONDUIT

Davis M. Phillips, South Milwaukee, Wis., assignor to McGraw-Edison Company, a corporation of Delaware Filed May 18, 1956, Ser. No. 585,727

2 Claims. (Cl. 285—39)

The present invention relates to fittings for frictionally joining pipe or conduit, and particularly relates to curvate fittings such as angular bends, elbows, and the like. The fittings disclosed hereinbelow have particular application for use with impregnated fibrous tubes, although equal benefit is obtained with any construction requiring sliding or slip-fit friction engagement.

It is now common practice to provide tubular housing for subterranean electric-wiring systems, such as electric power or telephone cables in waterproof fiber conduit, and also to provide impregnated fiber pipe for various plumbing uses including sewer, drain, septic sewage systems and numerous industrial non-pressure uses. The pipe or conduit sections used for such purposes are generally made by convoluting a wet web of papermaking pulp, as the web is being formed on a mandrel, into a tube of the desired wall thickness. The tube is then dried and impregnated with molten pitch or bituminous compound.

It has become general practice to join links of conduit or pipe by means of fittings that are driven in place in an axial direction to frictionally engage the tubular member by means of complementary tapered portions. The heat of driving tends to melt the impregnant to make a friction-welded joint.

There is little or no problem involved in driving a straight coupling fitting axially of said tube, as the fitting may be hit squarely at the end opposite from the tube along the axis thereof. However, in the case of fittings requiring a bend such as a 45° or 90° fitting, it is difficult, if not impossible, to strike the member with a direct blow. Consequently, there is a considerable tendency for the member to rake or cock relative to the longitudinal axis of the tube and consequently provide a relative insecure joint, which is not desirable from a waterproof and rootproof standpoint.

It is therefore an object of the present invention to provide a drive fitting for frictional engagement with a tubular member, wherein said fitting is curved or otherwise has an end deviating from the axial direction of the tube.

It is a further object of the present invention to provide driving bosses externally of said fitting, which bosses are positioned in predetermined relationship to the axis common to both the fitting and the tube to be joined therewith.

It is specifically an object of the present invention to provide a driving boss for a fitting frictionally engageable with a conduit or pipe, wherein the pounding surface of said boss is substantially normal to a line passing through the center of the interference cone of the tapered opening engageable with the member to be joined.

Fittings embodying features of the present invention are illustrated in the accompanying drawings forming a part of this application in which.

Figure 1:
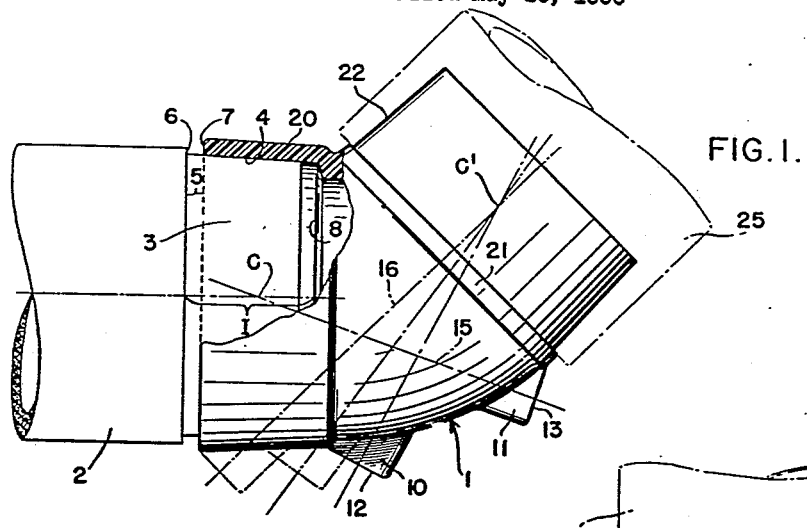
Fig. 1 is a side elevational view of a 45° elbow fitting fabricated in accordance with the present invention and shown fully engaging one tubular section, and with a portion cut away to show relative engagement with another tubular member just prior to being driven to complete frictional engagement therewith.

Referring now to Fig. 1, the present invention is best described in connection with a relatively short radius curvate fitting for joining two sections of tubing, such as a 45° elbow, denoted in general by the reference numeral 1. As shown, the fitting 1 is in partial engagement with a tubular pipe member 2. In the present case the pipe member is provided with a male tapered conical portion 3, extending from one end thereof. A complementary internally tapered surface 4 is provided at one end of the fitting 1 for frictional engagement with the outer surface of the portion 3. It is preferred that the angle of taper in both the male and female portions be the same, for instance, 2°, measured from the longitudinal axis. However, it is to be noted that the relative lengths of the mating members measured on the longitudinal axis are different, the axial length of the male frusto-conical portion being of slightly lesser dimension than the axial length of the female portion, for purposes hereinafter described.

It will be seen that the complementary tapered portions 3 and 4 will interfere with one another at some point determined by their relative axial lengths. The relationship between axial dimensions is readily established by truncating the tapered end of the male portion 3 to provide the end with a relatively larger diameter than the diameter of the internal taper 4 measured from the same axial points. Thus, a predetermined drive distance 5 is provided between the shoulder 6 on the member 2 and the extremity 7 of the fitting 1. This drive distance is determined by an interference cone of an axial length I, measured from the shoulder 6 to the internal shoulder 8 of the fitting 1. Thus, the two members 1 and 2 are in freely slidable engagement with one another for the major axial distance, the limit of which is established by the drive distance 5. Beyond this point, the members must be driven together to provide a tight frictional engagement with one another. In the case of pitch or bituminous impregnated member, the driving forces generate enough heat to melt the impregnant and thus provide an additional sealing means between the members.

The present invention contemplates the use of specially positioned driving bosses, such as the external bosses 10 and 11, which include pounding surfaces, or driving faces 12 and 13, respectively. Although, it is recognized that such bosses have been provided heretofore, it does not appear that any particular thought has been given to the relative position of the driving face on the respective embossment for establishing a resultant force that will practically eliminate any tendency to cock or rake by one member relative to the other during driving operations.

I have found that by maintaining the plane of the respective driving face substantially normal to a line lying in the plane of the longitudinal axis of the curved tubular fitting and intersecting both the center C of the interference cone (the axial length of which is denoted by the reference character I) and the driving face, the fitting will have practically no tendency to rake or cock relative to the member 2 during pounding operations. As shown in Fig. 1, the driving face 13 of the embossment 11 may be maintained at any point on the outer arcuate surface of the fitting 1 as long as it is substantially normal to the resultant force line 15.

It will also be observed from reference to the embossment 10, that the boss may be placed in various positions on the outer periphery of the fitting, and preferably at a position of greatest radial length from the center C of the interference cone. Obviously, if it were possible, the ideal position of the driving face 12 would be in a plane normal to the longitudinal axis 16 passing through the point C, which axis would also coincide with the line of resultant force. However, practicalities of design and manufacture generally limit the position of the embossment to the position shown adjacent the inner end of the radially extending hub portion 20. As far as the embossment 11 is concerned, its position is limited to being adjacent the shoulder 21 abutting the tapered male portion 22 of the fitting, which is frictionally engageable with the female taper of the member 25 (shown in Fig. 1 by the dot-dash lines), in the same manner as previously described in connection with the tubular member 2. In the latter case the center of the interference cone is denoted by the reference character C'. In addition, the member 25 is shown in full driven position relative to the fitting 1 to establish sealed frictional contact therewith.

Figure 2:
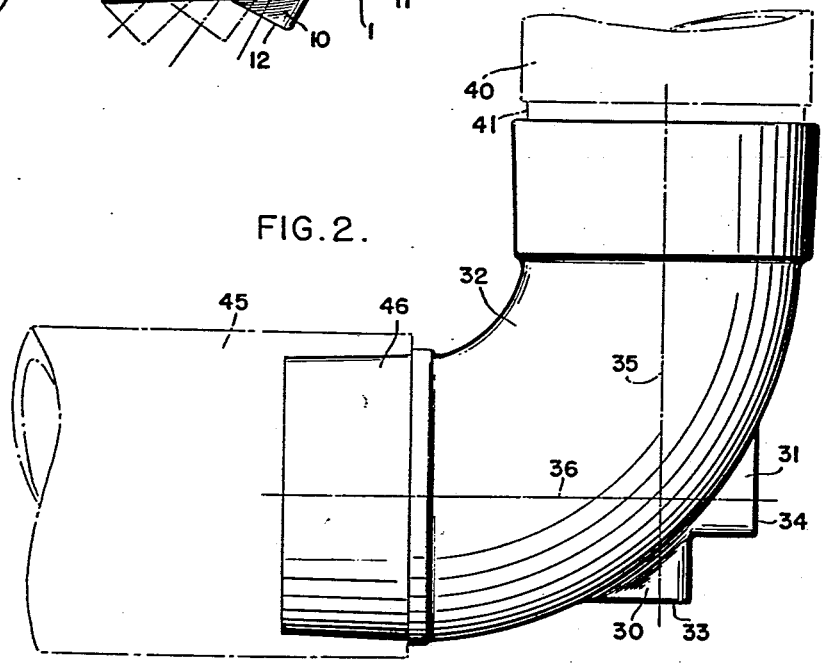
Fig. 2 is a side elevational view of the 90° elbow fitting embodying the present invention.

With reference to Fig. 2, there is shown a preferred arrangement of the embossments 30 and 31 with respect to a conventional 90° elbow fitting 32. In this connection, the driving faces 33 and 34 each lie in a plane substantially normal to the longitudinal axes 35 and 36, respectively.

As previously described in connection with Fig. 1, the fitting 32 is shown in "interference" position relative to a tubular member 40 (shown in dot-dash lines) having a male tapered conical portion 41 in position just prior to drive fitting. Thus, hammer blows to a wood block applied to the surface 33 will complete the drive to a sealed frictional engagement with the member 40. The relative final positions are indicated in connection with the member 45 (shown in dot-dash lines) in engagement with the male tapered conical portion 46 on the fitting 32. The 90° fitting readily lends itself to provision of the driving faces 33 and 34 in respective planes normal to the longitudinal axis for a direct drive along that axis.

Figure 3:
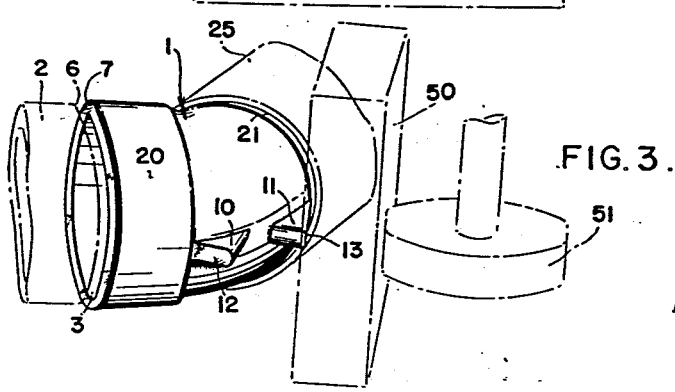
Fig. 3 is a perspective view showing an elbow type fitting embodying the present invention in the process of being driven in place relative to a joining complementary member.

In Fig. 3, a fitting, such as the 45° fitting shown in Fig. 1, is shown in position for driving to complete the frictional engagement between the members 2 and the fitting 1. It is preferred to put a block of wood 50 or some other flat member for receiving the direct blows from the hammer 51.

It will be apparent that the present invention has provided a drive fitting for conduit or pipe installations, which fitting is provided with driving lugs or embossments in predetermined position with driving surfaces lying in preferred planes to substantially eliminate any tendency for raking or cocking between frictionally engageable members during driving operations.

I claim:

1. A drive fitting assembly comprising a first tubular, impregnated fiber member and a second curvate tubular impregnated fiber fitting member axially slidable into frictional engagement with said first member, one of said members having an outwardly faced tapered fitting surface extending therefrom and the other member including an inwardly faced tapered surface complementary to said first tapered surface, said engaged tapered surfaces before driving defining a cone of interference extending between the outer ends respectively of the engaged tapered surfaces, stop means to limit the relative movement of said surfaces as they are driven into tighter engagement whereby to provide a predetermined axial driving distance, and means whereby driving forces exerted on said curvate member act in a direction to unite said members with a minimum tendency for relative cocking and raking, making the joint substantially waterproof and root-proof, said means comprising an impact driving boss integral with and positioned on the longest radius external surface of said curvate member, said boss having a flat driving surface presenting a small area relative to the diameter of said members, said driving surface being substantially normal to a line lying in the plane containing the longitudinal axis of said curvate member and intersecting both the center point of said cone of interference and said driving surface at substantially the center thereof, so that the resultant line of force of any blow applied to said driving surface coincides with said line passing through said center point of said cone of interference.

2. A drive fitting assembly comprising a pair of tubular, impregnated fiber members and a third curvate tubular impregnated fiber fitting member, each of said pair of members having an end portion and said curvate member having two end portions each of which is coupled in axially slidable frictional engagement with the said end portion of one of said pair of members, one of said members at each coupling having an outwardly faced tapered fitting surface extending therefrom and the other member including an inwardly faced tapered surface complementary to and in engagement with said first tapered surface, said engaged tapered surfaces before driving defining a cone of interference extending between the outer ends respectively of the engaged tapered surfaces, stop means to limit the relative movement of said surfaces as they are driven into tighter engagement whereby to provide a predetermined axial driving distance, and means whereby driving forces exerted on said curvate member act in a direction to unite said members with a minimum tendency for relative cocking and raking, making the joint substantially waterproof and rootproof, said means comprising a pair of impact driving bosses integral with and positioned on the longest radius external surfaces of said curvate member, each of said bosses having a flat driving surface presenting a small area relative to the diameter of said tubular members, said driving surface being substantially normal to a line lying in the plane containing the longitudinal axis of said curvate member and intersecting both the center point of a cone of interference and said driving surface at substantially the center thereof so that the resultant line of force of any blow applied to said driving surface coincides with said line passing through said center point of said cone of interference.

References Cited in the file of this patent

UNITED STATES PATENTS

| 306,523 | Read | Oct. 14, 1884 |
| 489,064 | Winkelmann | Jan. 3, 1893 |
| 933,116 | Sackett | Sept. 7, 1909 |
| 1,829,974 | Williams | Nov. 3, 1931 |
| 2,018,726 | Key | Oct. 29, 1935 |
| 2,056,304 | Sweet | Oct. 6, 1936 |
| 2,067,773 | Long | Jan. 12, 1937 |
| 2,131,839 | Hall | Oct. 4, 1938 |
| 2,470,308 | Haddican | May 17, 1949 |
| 2,532,918 | Hungerford | Dec. 5, 1950 |
| 2,739,829 | Pedlow | Mar. 27, 1956 |

FOREIGN PATENTS

| 10,980 | Great Britain | July 15, 1890 |
| 23,984 | Great Britain | Dec. 13, 1893 |
| 6,460 | Great Britain | Mar. 24, 1896 |
| 152,083 | Australia | June 29, 1950 |